United States Patent [19]

Romi

[11] Patent Number: 4,545,271

[45] Date of Patent: Oct. 8, 1985

[54] TURNING MACHINE

[75] Inventor: Giordano Romi, Santa Barbara d'Oeste City, Brazil

[73] Assignee: Industrias Romi S/A, Santa Barbara d'Oeste City, Brazil

[21] Appl. No.: 424,978

[22] Filed: Sep. 27, 1982

[30] Foreign Application Priority Data

Sep. 1, 1982 [BR] Brazil .................................. 8108057

[51] Int. Cl.$^4$ ............................................. B23B 17/00
[52] U.S. Cl. ........................................ 82/32; 82/2 R; 82/34 R
[58] Field of Search .................... 82/2 R, 32, 25, 2 D, 82/34 R; 29/36

[56] References Cited

U.S. PATENT DOCUMENTS

| | | | |
|---|---|---|---|
| 1,716,919 | 6/1929 | Drissner et al. | 82/32 |
| 1,914,984 | 6/1933 | Smith et al. | 82/2 R |
| 1,926,997 | 9/1933 | Hoelscher et al. | 82/32 |
| 1,957,667 | 5/1934 | Ritter et al. | 82/2 R |
| 2,389,746 | 11/1945 | Sparks et al. | 82/32 |
| 3,107,561 | 10/1963 | Haller et al. | 82/2 D |
| 3,186,266 | 6/1965 | Coate | 82/2 R |
| 3,423,812 | 1/1969 | Spur | 29/36 |
| 3,481,230 | 12/1969 | Horobin | 82/2 R |
| 3,534,643 | 10/1970 | Markgraf | 82/32 |
| 3,877,329 | 4/1975 | Noa | 82/2 R |
| 4,409,869 | 10/1983 | Berly | 82/2 R |

FOREIGN PATENT DOCUMENTS

| | | | |
|---|---|---|---|
| 27253 | 4/1981 | European Pat. Off. | 82/2 R |
| 2486848 | 1/1982 | France | 29/36 |
| 149090 | 11/1979 | Japan | 82/2 R |
| 45302 | 4/1981 | Japan | 82/2 R |
| 2040203 | 8/1980 | United Kingdom | 82/2 R |
| 755451 | 8/1980 | U.S.S.R. | 82/32 |

Primary Examiner—Leonidas Vlachos
Assistant Examiner—Jerry Kearns
Attorney, Agent, or Firm—Michael J. Striker

[57] ABSTRACT

A turning machine or more precisely a numerically controlled lathe consisting of bed and column or base having said bed a cross section of substantially trapezoidal shape having in its upper part parallel prismatic guideways arranged in accordance with two inclined planes for supporting and/or sliding of the headstock, tailstock and carriages with indexable toolholder, said inclined planes intersecting above said bed, and said parallel prismatic guideways which permit free movements between the carriages mounted on separate guideways and free movements between one of the carriages and tailstock which are mounted on separate guideways, without interference between all of them along the whole useful length of said separate parallel prismatic guideways. A transmission box for automatic speed change can be mounted also on the guideways opposite to the headstock guideways, said transmission box being servo-operated by means of clutches being the output shaft of said transmission box coaxial to the output shaft or main spindle of the headstock, being said headstock fixedly mounted on the same prismatic guideways for the tailstock. A bed and column or base assembly of unique design allows the free flow of a large volume of chips removed during machining, said column or base allowing the easy installation of a chip conveyor either longitudinally or transversally in respect to the lathe.

8 Claims, 12 Drawing Figures

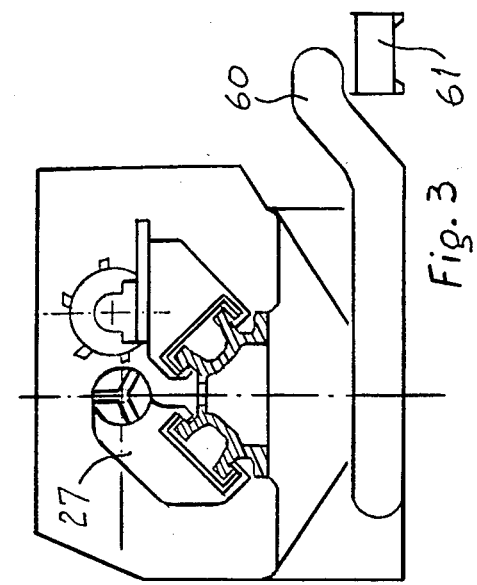
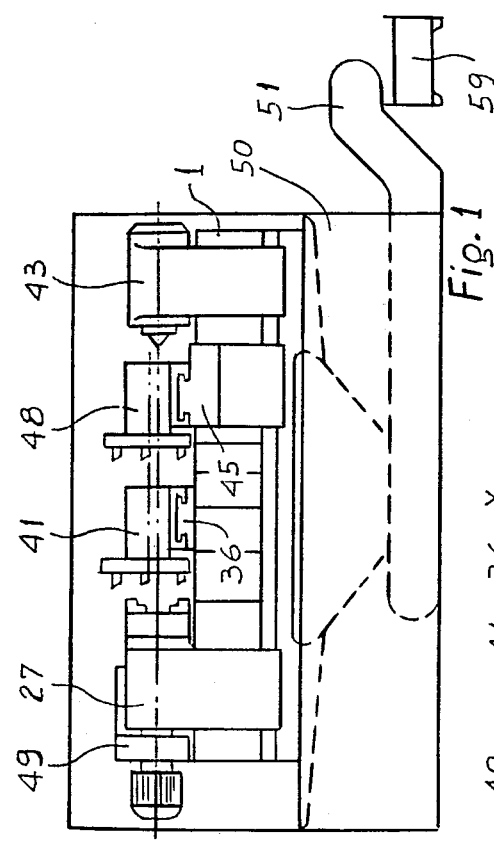
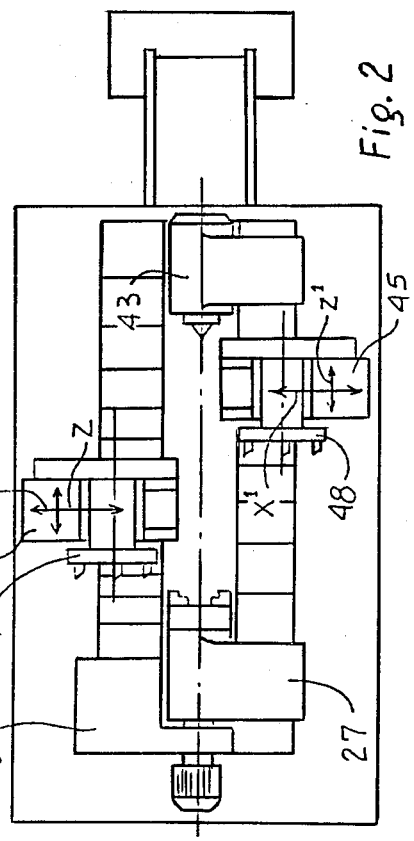

TURNING MACHINE

BACKGROUND OF THE INVENTION

The invention relates to a turning machine or more precisely to a numerically controlled lathe consisting of column and bed with guideways for supporting and sliding of carriages with indexable toolholder and the tailstock as well as for supporting and fixing of the headstock and the speed change gear box.

Numerically controlled lathes built up to the present, are specifically for two types of work, that is, chuck work and work between centers. Lathes specifically built for chuck work are able to perform these jobs properly and, with limitations they can perform jobs between centers, while lathes specifically built for work between centers can perform these jobs properly and, with limitations they can perform chuck work. Said numerically controlled lathes usually have parallel guideways for supporting and sliding of carriage with indexable toolholder and tailstock, lying on a single plane and in some cases, on different planes, and also said planes can be in horizontal, inclined or vertical positions. In the case of guideways arranged on inclined or vertical planes and when the lathe is equipped with two carriages carrying indexable tool-holder, there is the great inconvenience that chips removed by the machining operation performed by cutting tools of the upper carriage fall over the lower carriage causing great disadvantages such as dirt on the guideways and transmission of heat from the chips to the lower carriage components.

SUMMARY OF THE INVENTION

It is an object of the invention to provide a turning machine or more precisely a numerically controlled lathe that can perform machining work without limitation, restriction or inconveniences, that is, it can perform both chuck work and work between centers, in other words, a single machine, more universal and more versatile, for performing jobs that at the present state of the art require two different machines, as described above.

Another object of the invention is to provide a lathe which geometrical arrangement of the separate prismatic guideways for supporting and sliding of the carriage carrying indexable toolholder and for the tailstock, and the unique shape of the bed that incorporates those guideways results in a system that provides free movements for the carriage with indexable toolholder and for the tailstock without interference between them along the whole useful sliding length of the respective guideways, enabling the carriage to move freely and without interference in front of the tailstock.

Still another object of the invention is the utilization of the tailstock prismatic guideways for supporting and sliding of a second carriage with indexable toolholder and still to make possible the fast free flow of a large quantity of chips removed during machining with maximum work rigidity owing to the unique structural construction of the bed and column or base assembly.

It is a further object of the invention that the upper portion of the bed consists of two faces or sides arranged on two inclined imaginary planes intersecting in space above the bed, said faces or sides are structurally connected to each other forming at the upper part of said bed prismatic guideways which are parallel to each other oriented according to said inclined planes, which said guideways have the scope of supporting and permitting the sliding and guidance of the carriages and the tailstock.

Yet another object of the invention is to provide a lathe which structural shape of its column or base allows the installation of a conveyor for chip disposal mounted either longitudinally or cross wise in respect to the lathe. This feature is very important because the chip flow direction is of specific interest for lay-out designers, that is, to meet the requirements of modern industrial planning techniques, including the installation of the machine in respect to parts flow, chip flow and the position of the machine in respect to other machines and to the building and floor where they are located.

A further object of the invention as mentioned before is to provide a turning machine or more precisely a numerically controlled lathe which in its basic and most simple configuration consists of a bed and its column or base, a carriage with indexable toolholder with two crossed coordinate movements, axes "x" and "z" and a headstock, which said lathe allows to perform proper and efficient chuck work and which by adding a tailstock the lathe becomes suitable for both chuck work and work between centers, both equally efficiently and still by the addition of a second carriage with indexable toolholder it becomes suitable for chuck work and work between centers that require four crossed coordinate movements that is, four axes ("x", "z", "x¹" and "z¹") and still by the addition of a transmission box for automatic speed change through servo-operated clutches, resulting in a greater degree of application for the lathe in the constant power range, being said addition of the transmission box possible without any component changes.

In the basic configuration of the lathe the headstock is rigidly mounted at one of the bed ends on parallel prismatic guideways on one of the inclined planes, and the carriage with indexable toolholder slides on prismatic guideways of the other inclined plane and on the opposite side of the inclined plane where the headstock is fixed. When the tailstock is added, said tailstock slides longitudinally on the same guideways where the headstock is fixed, and said tailstock can be rigidly clamped along these guideways at any position necessary for performing work between centers, and the center line or geometric axis of the tailstock center and the center line or geometric axis of the headstock main spindle are coaxial and parallel to the bed guideways, and said coaxial center lines are contained in an imaginary vertical plane that can cross either the imaginary line of intersection of the two inclined planes of the bed guideways or close to said intersection line. Owing to the arrangement of the bed inclined planes and respective guideways, the referred carriage with indexable toolholder can be freely moved longitudinally and along the whole length of the bed without interfering with the headstock or tailstock.

Still, on the guideways where the headstock and tailstock are mounted, a second carriage with indexable toolholder can be installed, which can slide on these guideways on the space between the headstock and the tailstock, which can be independently or simultaneously operated with the first carriage with indexable toolholder because being the two carriages slidable on independent guideways and located on opposite inclined planes, said carriages can be freely moved one in front of the other without interference between them and without the inconvenience that chips removed by the cutting tool of one of the carriages are thrown over the other carriage. On the guideways for the first carriage with indexable toolholder located on a plane opposite to the guideways plane where the headstock is located at the portion of these guideways located at the bed end, which is not used by said carriage, a transmission box can be installed, which said transmission box incorporates clutches for speed changes which by construction and without requiring any adjustments, it is also connected to the headstock to enable automatic speed changes to the main spindle, through servo-operated clutches.

The geometrical shape of the bed and column or base assembly, has been studied and its profile developed in a way that it results in a combination of inclined planes, which configuration makes possible the free flow of a large quantity of chips, removed during machining. Chips that flow through the inclined planes opposite to each other on the upper external portion of the bed, fall in the interior of the base on inclined planes opposite to the bed inclined planes, and through the base inclined planes the chips are directed to the central portion of the base or column, where by gravity they flow through an opening existing in the interior of the base to a chip conveyor located in the lower portion of said base. Also through openings located longitudinally at the upper central portion between the bed upper guideways some chips may flow by gravity through the interior of the bed structure until they reach an opening existing in the interior of the base and then fall freely over said chip conveyor. The combination of inclined planes and the structural shape of the base enables that the chip conveyor is installed either longitudinally or transversally in respect to the lathe. The bed geometrical shape has been studied and developed having in mind the optimization of rigidity conditions no matter how the three component forces act during machining.

The novel features which are considered as characteristic for the invention are set forth in particular in the appended claims.

The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a front view of the lathe in its most complete configuration, that is, with two carriages each containing an indexable toolholder, headstock, speed change clutch box, tailstock and chip conveyor installed longitudinally in respect to the lathe base or column.

FIG. 2 is a top view of the lathe in its most complete configuration according to FIG. 1.

FIG. 3 is a side view and cross section of the lathe, showing a second application for the chip conveyor installed transversally in respect to the lathe base or column.

DETAILED DESCRIPTION OF THE PREFERRED EMBODIMENTS

Figure 5:
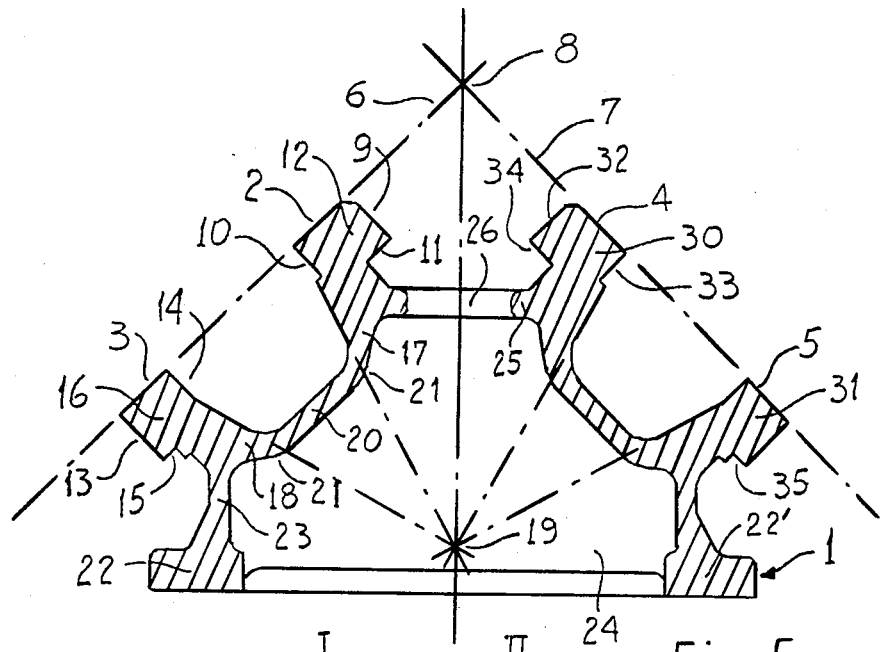
FIG. 5 is a cross section of the bed, along line A—A of FIG. 4.

As illustrated in FIG. 5, bed 1 is shown with upper sliding surfaces 2-3 and 4-5 arranged in inclined planes 6 and 7 respectively, which planes are crossed and which line of intersection 8 is shown by its projection in FIG. 5, having said bed cross section in substantially trapezoidal shape and which sliding surfaces have: perpendicular to the upper sliding surface 2 of inclined plane 6 the side sliding surfaces 9 and 10, and parallel to the same surface 2 there is lower sliding surface 11, where surfaces 2, 9, 10 and 11 make up the main prismatic guideway 12, located at side "I" of the bed, being said side made up by the vertical plane through said imaginary intersecting line 8, dividing said bed in side "I" and side "II"; perpendicular to the upper sliding surface 3 are side surfaces 13 and 14 and parallel to the same surface 3 there is lower sliding surface 15, being that surfaces 3, 13, 14 and 15 make up secondary prismatic guideways 16 of side "I" of the bed. Main prism 12 and secondary prism 16 are connected to each other longitudinally to the bed by a "U" shape rib or beam, consisting said rib or beam of walls 17 and 18 slightly inclined in respect to surfaces 10 and 14, with external surfaces converging to point 19, and of wall 20 which is connected to walls 17 and 19, being that connecting corners 21 are rounded.

The section consisting of main prism 12, secondary prism 16 and "U" shape connecting rib is attached to base beam 22 longitudinal wise through wall 23, being that beam 22' of side II of the bed is connected to the upper part on this same side through a wall similar to the one numbered 23 and in inverted position in respect to said wall 23. Side "II" of the bed is perfectly simetrical to side "I" and rigidly connected to it through cross walls 24, conveniently spaced from each other and through longitudinal wall 25, which is provided with holes 26 that are designed to allow free flow of chips, the bed comprised of sides "I" and "II" and their connecting walls result in an extra and super rigid monobloc structure.

Figure 6:
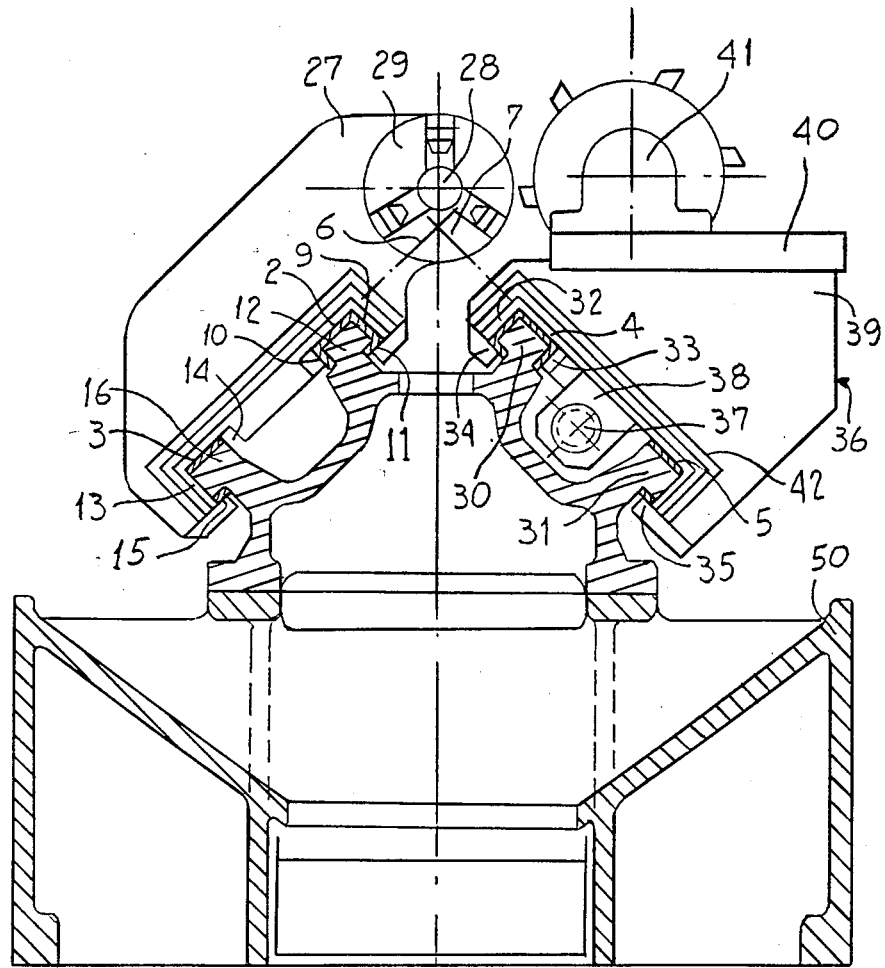
FIG. 6 is a partial cross section showing the bed and column or base assembly, headstock and carriage with indexable toolholder that constitute the basic lathe configuration, illustrating constructive details.

On one of the ends of the bed and aligned by prisms 12 and 16 consisting of sliding surfaces 2-9-10-11 and 3-15 respectively (FIG. 6), the headstock 27 is mounted and guided aligned by said prisms so that the center or geometric axis 28 of headstock main spindle and respective chuck 29 for holding the workpiece, are perfectly parallel longitudinally with the surfaces of said prisms and located on a vertical plane that may cross either imaginary line 8 of intersection of inclined planes 6 and 7 or close to it. On prisms 30 and 31 consisting of sliding surfaces 4-32-33-34 and 5-35, respectively, located on inclined plane 7, carriage 36 slides driven by screw 37 and nut 38, being that said carriage comprising a base 39, a cross support 40 that slides on guideways arranged on the upper part of base 39 and an indexable toolholder 41 mounted on movable cross support 40 resulting in a carriage with two cross coordinate movements "x" and "z". Telescopic cover 42 protects guideways of prisms 30 and 31 against dirt and chips removed during machining. This assembly of the bed with its respective base 50, headstock 27 and carriage with indexable toolholder 41 constitutes the basic lathe configuration, that is, the most simple that enables to perform proper and efficient chuck work.

Figure 7:
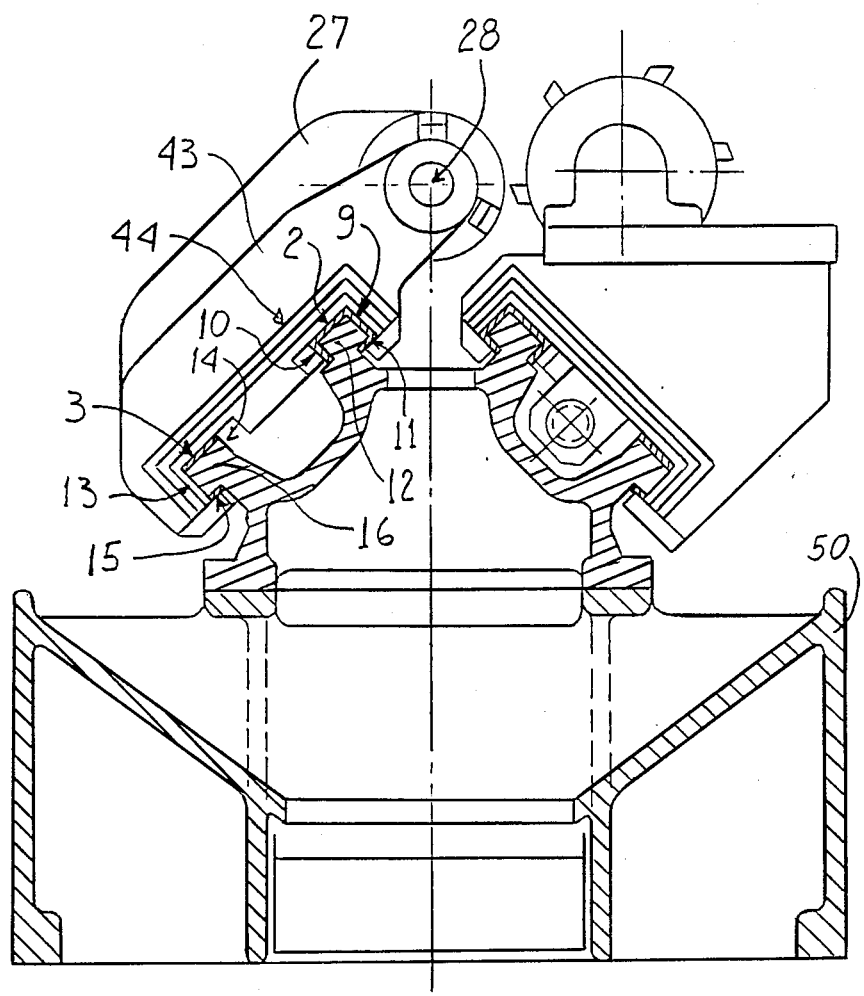
FIG. 7 is basically the same FIG. 6, with the addition of the tailstock.

On the same prisms 12 and 16 where the headstock 27 (FIG. 7) is mounted, can be mounted the tailstock 43 which is adjusted to these prism guideways with the possibility of sliding longitudinally and being rigidly clamped by conventional clamping means having the center of its quill and respective center axially aligned with geometric axis 28 of headstock 27 main spindle. Telescopic cover 44 as illustrated in FIG. 7 protects prismatic guideways 12 and 16 against dirt and chips removed during machining. With the addition of tailstock 43 the lathe becomes suitable to perform chuck work and work between centers equally well.

Figure 8:
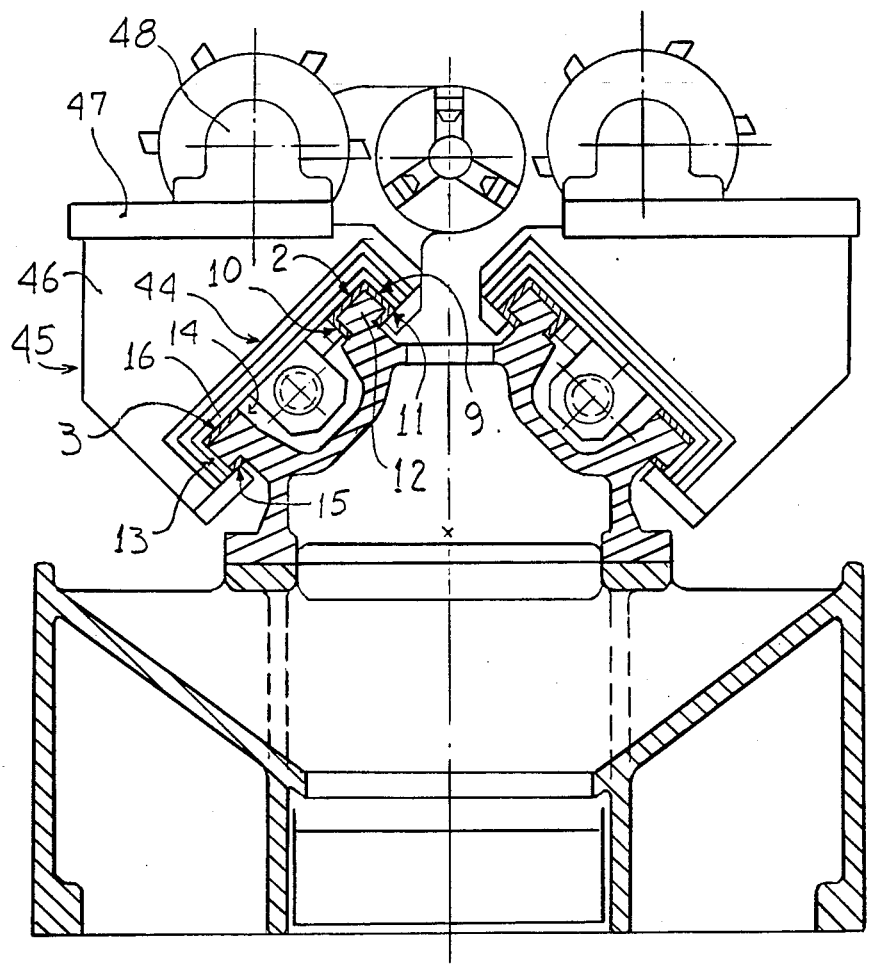
FIG. 8 is also the same FIG. 6 with the addition of the second carriage with indexable toolholder.
Figure 9:
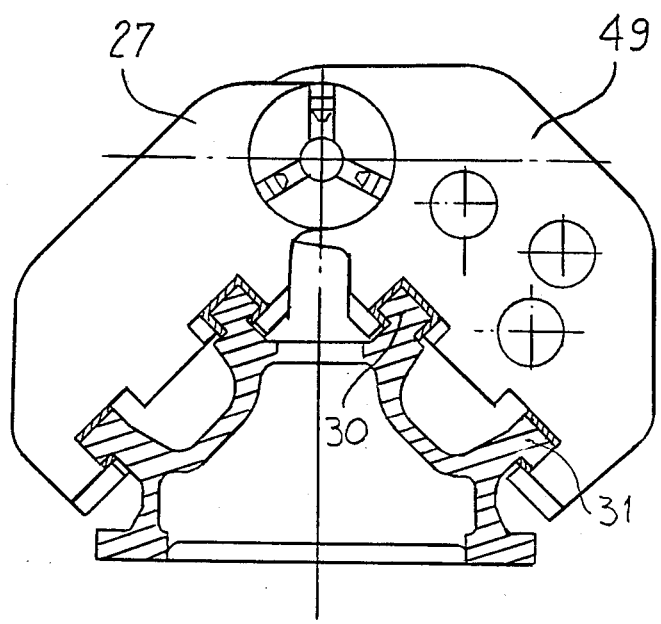
FIG. 9 is a cross section of the bed as shown in FIG. 5 with the addition of the headstock at the left and the automatic speed change clutch and gear box at the right.

On the same prisms 12 and 16 (FIG. 8) can also be mounted a second carriage 45 with indexable toolholder consisting of base 46, cross support 47 and indexable toolholder 48, changing from a lathe of two cross coordinate axes to a lathe of four cross coordinate axes, "x", "z", "x¹" and "z¹". On the end of bed 1 where the headstock 27 is mounted and on prisms 30 and 31 on a plane opposite to the plane on which said headstock 27 (FIG. 9) is mounted, can be mounted a transmission box 49 consisting of clutches for automatic speed changes which because it is mounted on prisms 30 and 31 which are perfectly parallel to prisms 12 and 16 and once adjusted, it maintains in perfect alignment with headstock 27 with no need of further adjustments.

Figure 4:
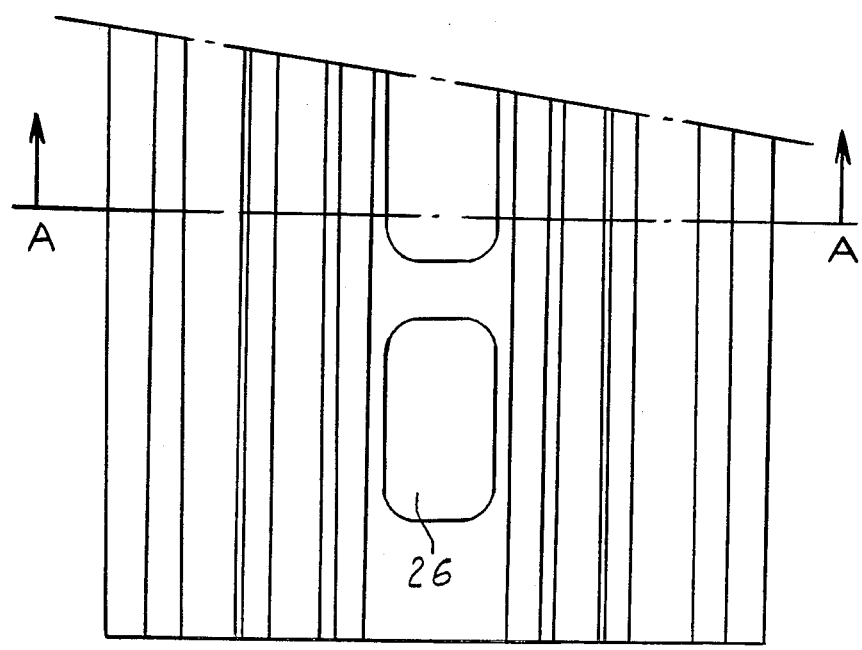
FIG. 4 is a partial top view of one of the bed ends.
Figure 10:
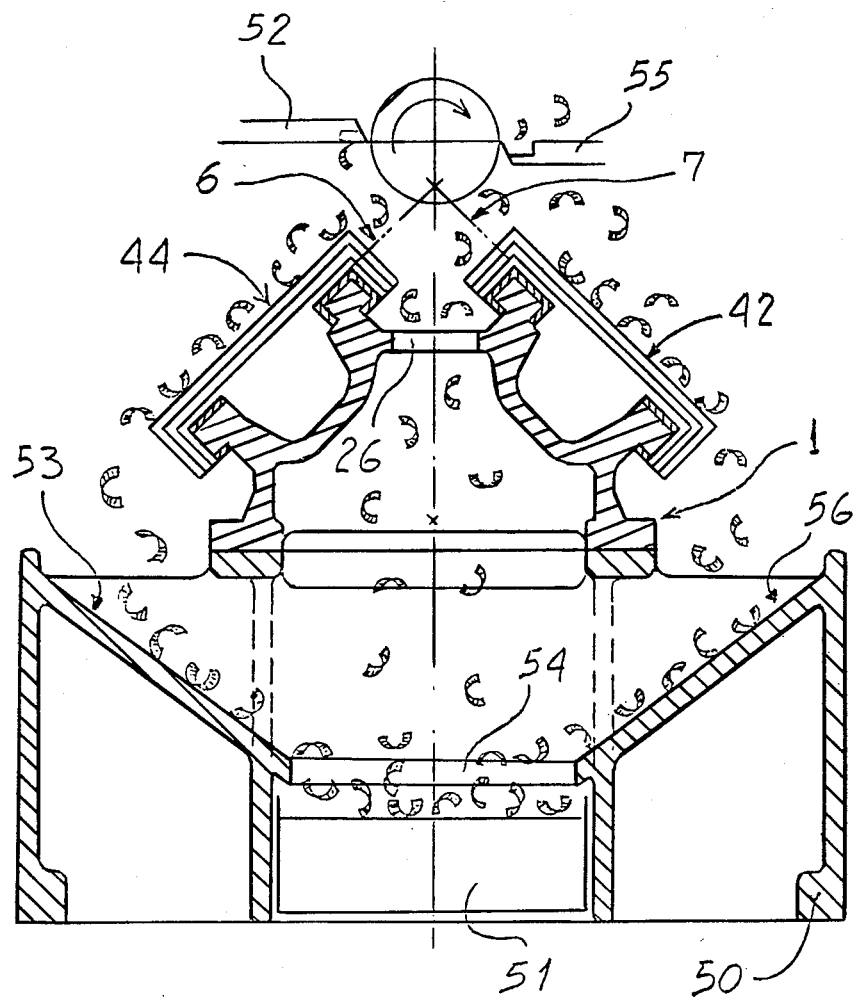
FIG. 10 is a cross section of the bed and column or base assembly, illustrating chip flow path.

Chips removed during machining (FIG. 10) flow freely through three different ways and as a consequence of bed 1 design and column 50 configuration, chips are collected in the interior of column 50 and as a first solution are directed to a chip conveyor 51. The three said ways are the following: (a) chips removed by cutting tool 52 are directed over the prism guideways protecting telescopic cover 44, flowing by gravity, sliding on the inclined plane of this protection, falling vertically and freely until they reach plane 53 which is inclined in a direction opposite to the plane of protecting telescopic cover 44 and by flowing by gravity, sliding over this plane chips are redirected to the central portion of base or column 50 and through opening 54 of this base they flow until they reach chip conveyor 51; (b) chips removed by cutting tool 55 are directed over prism guideways protecting telescopic cover 42, flowing by gravity over inclined plane of this protection falling vertically and freely until they reach plane 56, which is inclined in a direction opposite to the plane of telescopic cover 42 and by flowing by gravity, sliding over this plane chips are redirected to the central portion of column 50 and through opening 54 of this column they flow until they reach chip conveyor 51; (c) a small quantity of chips removed by cutting tools 52 and 55 that fall between protecting telescopic covers 42 and 44 flow by gravity through openings 26 (FIGS. 4 and 10) located longitudinally between guideways 12 and 30 going through the interior of bed 1 until they reach chip conveyor 51.

Figure 11:
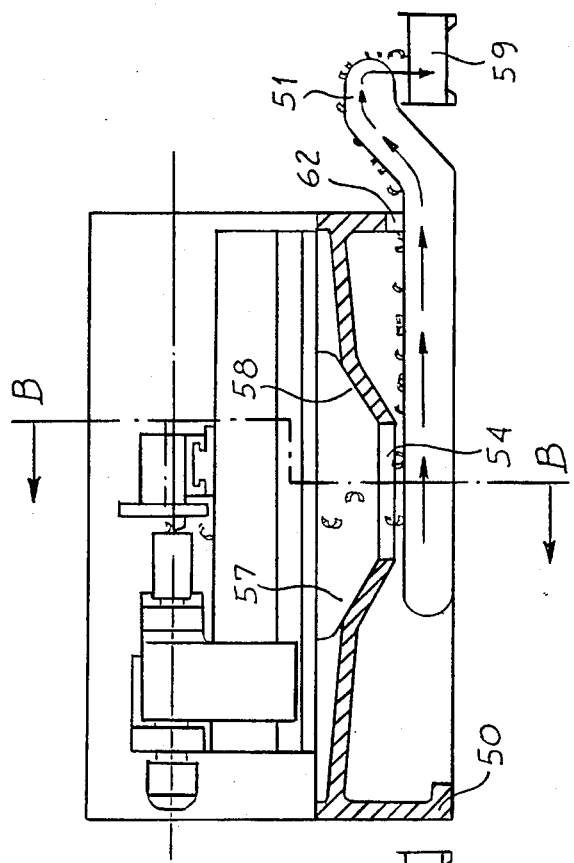
FIG. 11 is a longitudinal section of the lathe with the chip conveyor installed longitudinally in respect to the base. or column.
Figure 12:
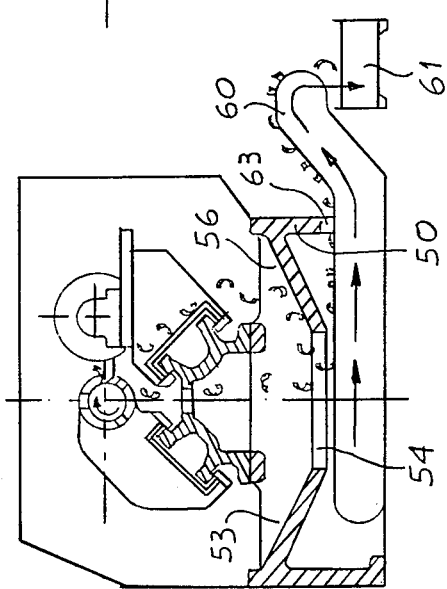
FIG. 12 is a cross section of the lathe along line B—B of FIG. 11, showing the chip conveyor installed transversally in respect to the base or column.

The combination of inclined planes 53, 56, 57 and 58 (FIGS. 11 and 12) and the position of opening 54 in the base structure, enable that the chip conveyor 51 is mounted inside base 50 and longitudinally to the lathe, protruding said chip conveyor 51 outside said base 50 through opening 62 and chips collected in container 59, as an alternative another chip conveyor 60 may be installed cross wise to base 50 protruding outside said base through opening 63 for side flow of chips as illustrated in FIG. 12, being said chips collected in container 61.

While the invention has been illustrated and described as embodied in a turning machine, it is not intended to be limited to the details shown, since various modifications and structural changes may be made without departing in any way from the spirit of the present invention.

Without further analysis, the foregoing will so fully reveal the essence of the present invention that others by applying current knowledge, can readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A lathe comprising:
    a longitudinal bed having support means disposed thereon including a first pair and a second pair of prismatic guideways oriented with respect to one another in first and second intersecting inclined opposing planes which form an inverted V symmetrical relative to a vertical plane, said guideways of each said pair being spaced apart from and parallel to each other and arranged longitudinally to said bed, said bed having a plurality of openings disposed between said first and second pair of prismatic guideways for chip flow from the lathe;
    a headstock supported by said first pair of prismatic guideways;
    a first carriage having a first indexable tool holder and supported by said second pair of prismatic guideways;
    a second carriage having a second indexable tool holder and supported by said first pair of prismatic guideways;
    a tailstock supported by said first pair of prismatic guideways;
    a transmission and automatic speed box containing servooperated clutches and supported by said second pair of prismatic guideways;
    a chip conveyor;
    means for separately covering said first and said second pair of prismatic guideways so as to form downwardly, outwardly inclined planes having external surfaces; and
    a base supporting said bed and having a plurality of internally disposed planar surfaces inclined downwardly, inwardly and symmetrically relative to said vertical plane and forming internal surfaces, a first opening in said base for chip flow, and a second opening in said base for installation of said chip conveyor, said inclined planes of said covering means and said planar surfaces guiding the chip flow to said first opening in said base so that the chips flow first over said external surfaces of said inclined planes of said guideway covering means and then over said internal surfaces of said planar surfaces of said base into said first opening in said base and onto said chip conveyor, said plurality of said openings providing for chip flow through said first opening in said base onto said chip conveyor.

2. The lathe as defined in claim 1, wherein said first and said second inclined opposing planes intersect above said bed.

3. The lathe as defined in claim 1, wherein each of said first and said second pair of prismatic guideways has an upper and lower prismatic guideway, said bed having a top at which is disposed substantially horizontal structural rigid connection means to join said upper prismatic guideways of said first and said second pair of prismatic guideways and containing a plurality of openings, said bed having first and second beams and spaced internally vertically connecting walls disposed transversely to said prismatic guideways and structurally connecting said upper guideways, said lower guideways and said plurality of beams, said bed having a first plurality of walls disposed at said first inclined opposing plane and connecting said upper and lower prismatic guideways of said first pair of prismatic guideways to each other and connecting said lower prismatic guideway of said first pair of prismatic guideways to said first beam, said bed having a second plurality of walls disposed at said second inclined opposing plane and connecting said upper and lower prismatic guideways of said second pair of prismatic guideways to each other and connecting said lower prismatic guideway of said second pair of prismatic guideways to said second beam.

4. The lathe as defined in claim 1, wherein said first carriage is provided with two crossed coordinate movement axes x and z, respectively, and said first pair of prismatic guideways being adequately separated from said second pair of prismatic guideways.

5. The lathe as defined in claim 1, wherein said transmission box and said headstock have power output shafts that are coaxial.

6. The lathe as defined in claim 1, wherein said second carriage is provided with two crossed coordinate movement axes x' and z', respectively.

7. The lathe as defined in claim 1, wherein said bed is rigidly mounted to said base having external walls, said second opening formed in said external walls of said base to enable the installation of said chip conveyor.

8. The lathe as defined in claim 7, wherein said base has vertical walls and said plurality of planar surfaces includes two opposing inclined walls having first end portions connected to said vertical wall of said base and having second end portions together forming a cone shape terminating at said first opening of said base.

* * * * *